United States Patent [19]
Pessen

[11] 3,776,060
[45] Dec. 4, 1973

[54] QUICK-RELEASE MECHANISM FOR SELF-LOCKING MATING WORMS

[76] Inventor: David W. Pessen, 33 Aviv St., Mt. Carmel, Haifa, Israel

[22] Filed: Oct. 2, 1972

[21] Appl. No.: 293,771

[52] U.S. Cl. .............................................. 74/424.7
[51] Int. Cl. ............................ F16h 1/08, F16h 1/18
[58] Field of Search ......................... 74/424.5, 424.7

[56] References Cited
UNITED STATES PATENTS
3,508,452   4/1970   Roantree ........................... 74/424.7

Primary Examiner—Leonard H. Gerin

[57] ABSTRACT

The invention is a modification of a self-locking mating worm drive, such as the drives described in U.S. Pat. Nos. 2,973,660 and 3,343,426. The modification consists of a nut mounted on one of the worm shafts with a very large pitch angle, such that it is not self-locking. This nut keeps the two worms in mesh, and axial motion of the nut is prevented by a tapered key. When this key is removed, the axial pressure of the worm pushes the nut sideways, until the two worms disengage. The self-locking property of the worm drive can thus be removed at will.

5 Claims, 1 Drawing Figure

PATENTED DEC 4 1973　3,776,060
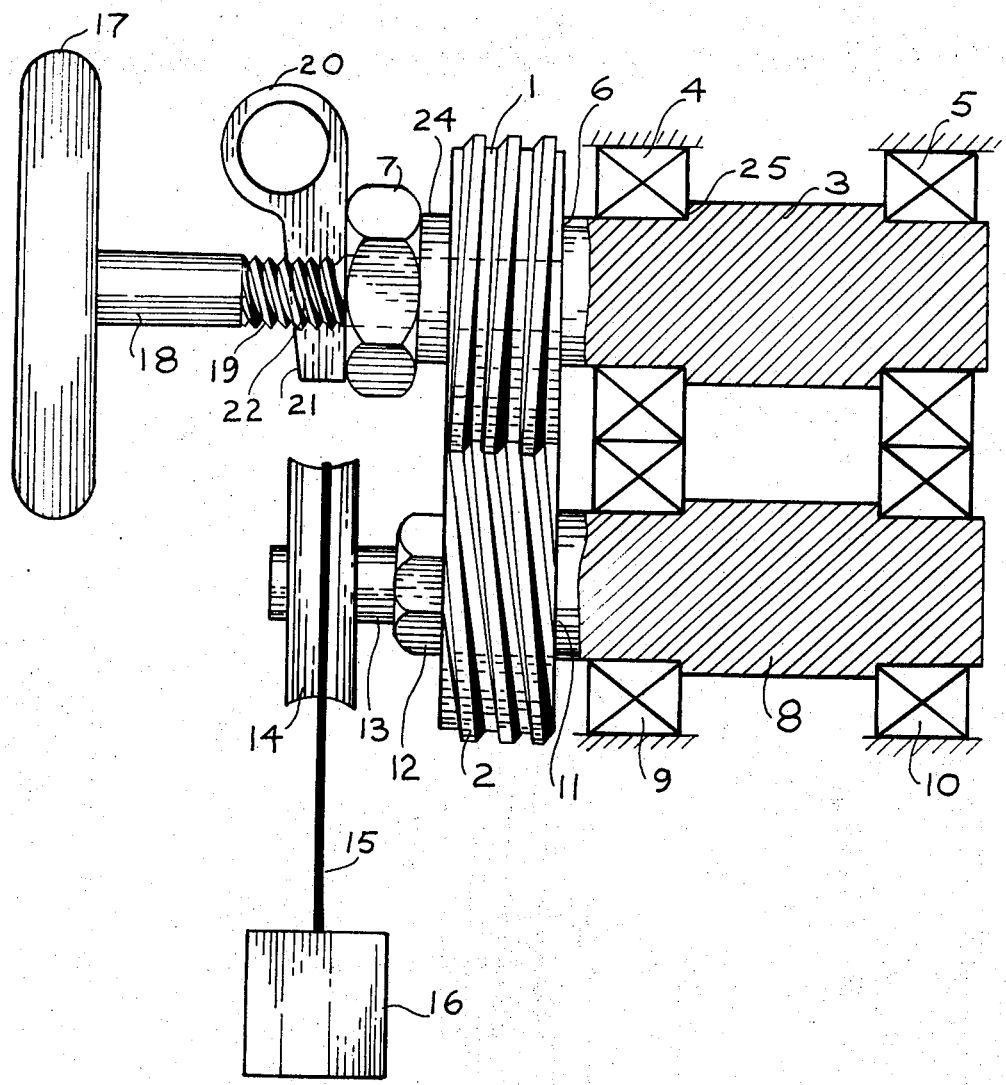

QUICK-RELEASE MECHANISM FOR SELF-LOCKING MATING WORMS

SUMMARY OF THE INVENTION

The present invention relates to a release mechanism for self-locking mating worms of the type described in U.S. Pat. Nos. 2,973,660 and 3,343,426.

An object of the invention is to provide a simple mechanism whereby the self-locking characteristics of the mating worms can be quickly removed when so desired.

A further object is to facilitate easy reinstatement of the self-locking characteristic.

A further object is to permit lowering of a load in the case of mating worms with so-called second-order self-locking which ordinarily would not permit lowering of the load.

Further objects appear in the specification and in the claims.

BRIEF DESCRIPTION OF THE DRAWINGS

In the Drawing I have chosen to illustrate only one of the numerous embodiments in which the invention may appear, selecting the form shown from the standpoint of convenience in illustration, satisfactory operation, and clear demonstration of the principles involved.

FIG. 1 is a front elevation in partial section of the invention in combination with the device with which it is designed to be used.

DESCRIPTION OF THE PREFERRED EMBODIMENT

Describing in illustration but not in limitation and referring to the drawing:

Worms 1 and 2 represent two mating worms with self-locking characteristics. Worm 1 is the driver, and can drive worm 2 in either direction, but worm 2 cannot drive worm 1 in any direction. The construction of such worms is described in detail in the above-cited U.S. Patents, where it is explained that the pitch angles of the two worms must be chosen according to certain rules there specified in order to obtain a worm drive which possesses self-locking and, at the same time, operates with a high efficiency.

Worm 1 is rotatably mounted with a sliding fit on extension 18 of shaft 3 suspended in bearings 4 and 5. These bearings should be of a type able to withstand both axial and radial loads, such as a bushing seating against shoulder 25 on shaft 3. Alternatively, tapered roller bearings or angular contact ball bearings could be used. Worm 1 is constrained by shoulder 6 on shaft 3, and by nut 7 having a shoulder 24.

Worm 1 drives worm 2 which is mounted on shaft 8 suspended in bearings 9 and 10. These bearings, similarly to bearings 4 and 5, should be of a type able to withstand both axial and radial loads. Worm 2 is constrained by shaft shoulder 11 and lock nut 12. Lock nut 12 is threaded on the shaft extension 13 until it bears tightly against worm 2, so that worm 2 is tightly held between shoulder 11 and lock nut 12 and is unable to slip relative to shaft 8.

Pulley 14 is rigidly mounted on shaft extension 13 and is connected by a cable 15 and load 16, which is to be raised or lowered. Handwheel 17 is rigidly mounted on shaft extension 18. By turning handwheel 17 in the proper direction, the load can be raised by any desired amount. Handwheel 17 can be stopped at any desired position, whereupon load 16 will remain locked at its corresponding position due to the self-locking characteristics of the worms 1 and 2, as disclosed in the afore-mentioned U.S. Patents.

It should be understood that the load 16 need not necessarily be a weight to be raised or lowered, but could represent any other type of load, such as, for example, a spring-loaded brake. The weight shown in the drawing is used only for the sake of illustration. Similarly, it should be understood that the driver 17 need not be a handwheel, but could be an electric motor or any other type of driving device.

The occasion can arise where it becomes desirable to quickly release the load 16. This could be accomplished by introducing a clutch between the pulley 14 and worm 2, but such clutches are generally expensive and space consuming. The present invention replaces such clutches, and permits quick release of the load 16 by removing the self-locking characteristics of the worms 1 and 2. However, the present invention is based on entirely different principles than clutches, and instead makes use of the peculiar mode of operation of self-locking mating worms.

According to the invention, the nut 7 is mounted on shaft extension 18 by means of a threaded portion 19 having a very large pitch angle, so that said nut 7 is not self-locking but is easily rotated by applying pressure to it in the axial direction. Nut 7 is held in place by key 20 having a tapered end 21 which fits tightly into tapered slot 22 in shaft extension 18. When it is desired to quickly release load 16, it is necessary only to remove key 20. The force of the load 16 is transmitted through shaft extension 13 and worm 2, and produces an axial thrust on worm 1 tending to move worm 1 in the direction towards handwheel 17. This axial thrust is normally resisted by the nut 7 and key 20. However, when the key 20 is removed, the worm 1 is not constrained any longer, but will turn and thereby unthread itself out of engagement with worm 2. In doing so, it will move axially, and push nut 7 towards the handwheel 17. As soon as worm 1 has moved axially by an amount equal to its width, all contact between worms 1 and 2 will be lost, and worm 2 will be completely freewheeling.

When it is desired to reinstate self-locking, nut 7 must be turned so that it will move axially towards worm 1. In this manner, worm 1 is again threaded into contact with worm 2. As soon as worm 1 again bears against shoulder 6, the key 20 is inserted tightly into slot 22. The drive will now be self-locking, and load 16 can again be raised or lowered by turning handwheel 17.

As disclosed in the above-cited U.S. Patents, mating worms can be designed to exhibit second-order self-locking characteristics. A drive using such worms becomes locked as soon as the load tends to help the driver. In the example illustrated in FIG. 1 of the present specification, this would mean that the load 16 could never be lowered, since the load always pulls downward, and therefore helps rather than opposes the driver when the driver attempts to lower the load. It would be very desirable to be able to use a mating-worm drive with second-order self-locking even in the absence of a need for the particular properties associated with second-order self-locking, because such drives ordinarily have an even higher efficiency than mating-worm drives with first-order or ordinary self-locking. However, due to the characteristics described above, such second-order self-locking could not be used heretofore wherever it was necessary to lower loads. By virtue of the present invention, it becomes possible to use a drive with second-order self-locking even where the load needs to be lowered, since the self-locking characteristics can easily be removed by removal of the key 20.

It should be noted that the invention could alternatively be applied to the driven worm 2, so that worm 2 would be permitted to move axially out of engagement with worm 1. The principle of operation of the invention would be identical.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, I claim:

1. A self-locking mating-worm drive comprising two mating worms mounted on two respective rotatable shafts, first constraining means for constraining the first of said worms in the axial direction of its shaft, movable second constraining means for constraining the second of said worms in the axial direction of its shaft, disengageable locking means for locking and unlocking said movable second constraining means in position, whereby said second worm is permitted to unthread itself out of engagement with said first worm when said locking means is disengaged.

2. A device according to claim 1, wherein said movable second constraining means comprises a nut threaded on the worm shaft with a thread pitch angle large enough to prevent self-locking of said nut.

3. A device according to claim 1, wherein the shaft of said second worm comprises a tapered slot, and wherein said disengageable locking means comprises a tapered key adapted to fit tightly into said tapered slot.

4. A device according to claim 1, wherein said first worm is the driving worm.

5. A device according to claim 1, wherein said first worm is the driven worm.

* * * * *